Dec. 8, 1959    E. W. LARSEN    2,916,224
CAPACITOR WINDING MACHINE
Filed Nov. 6, 1953    4 Sheets-Sheet 1
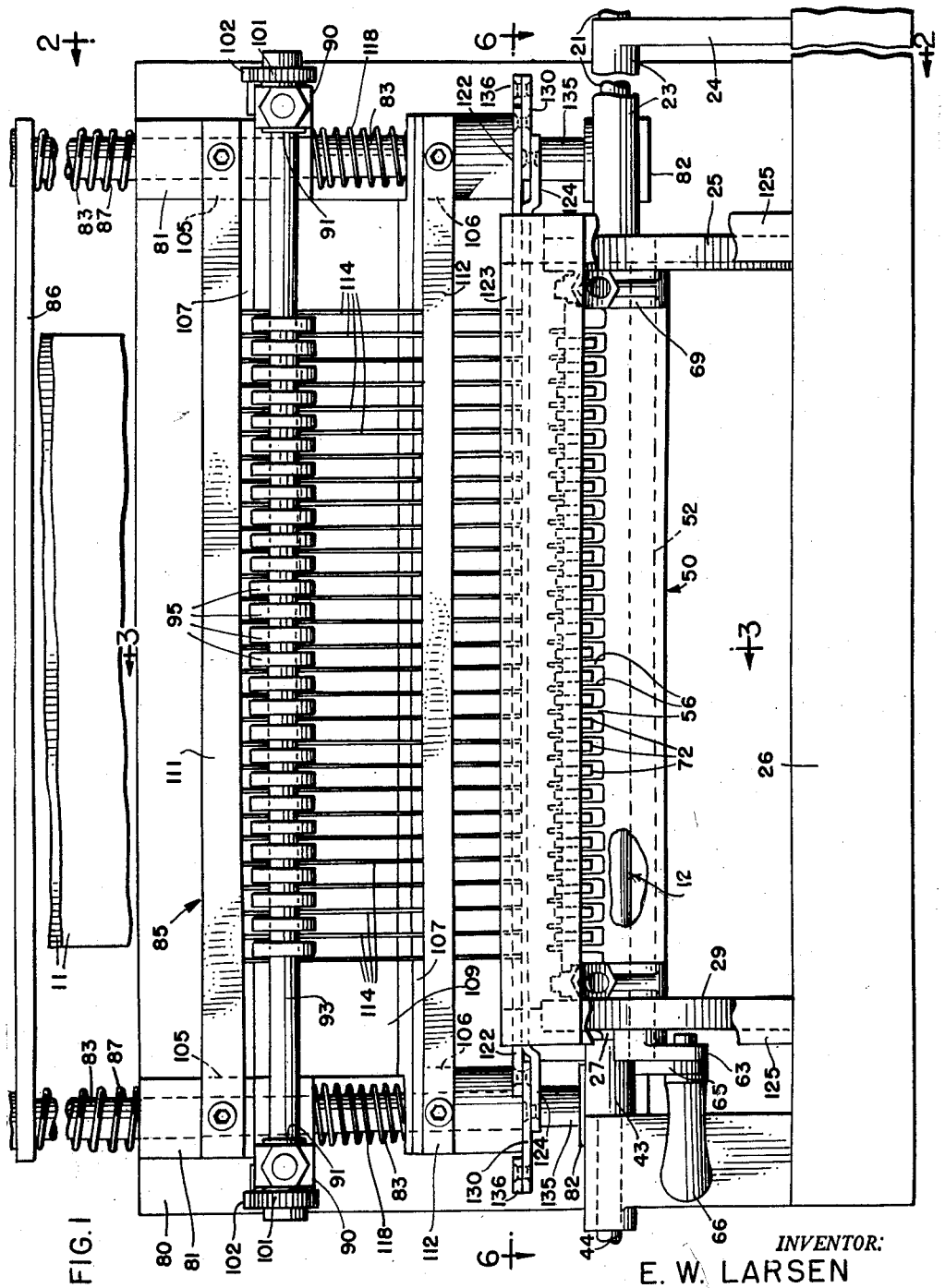
INVENTOR:
E. W. LARSEN
BY
C. B. Hamilton
ATTORNEY

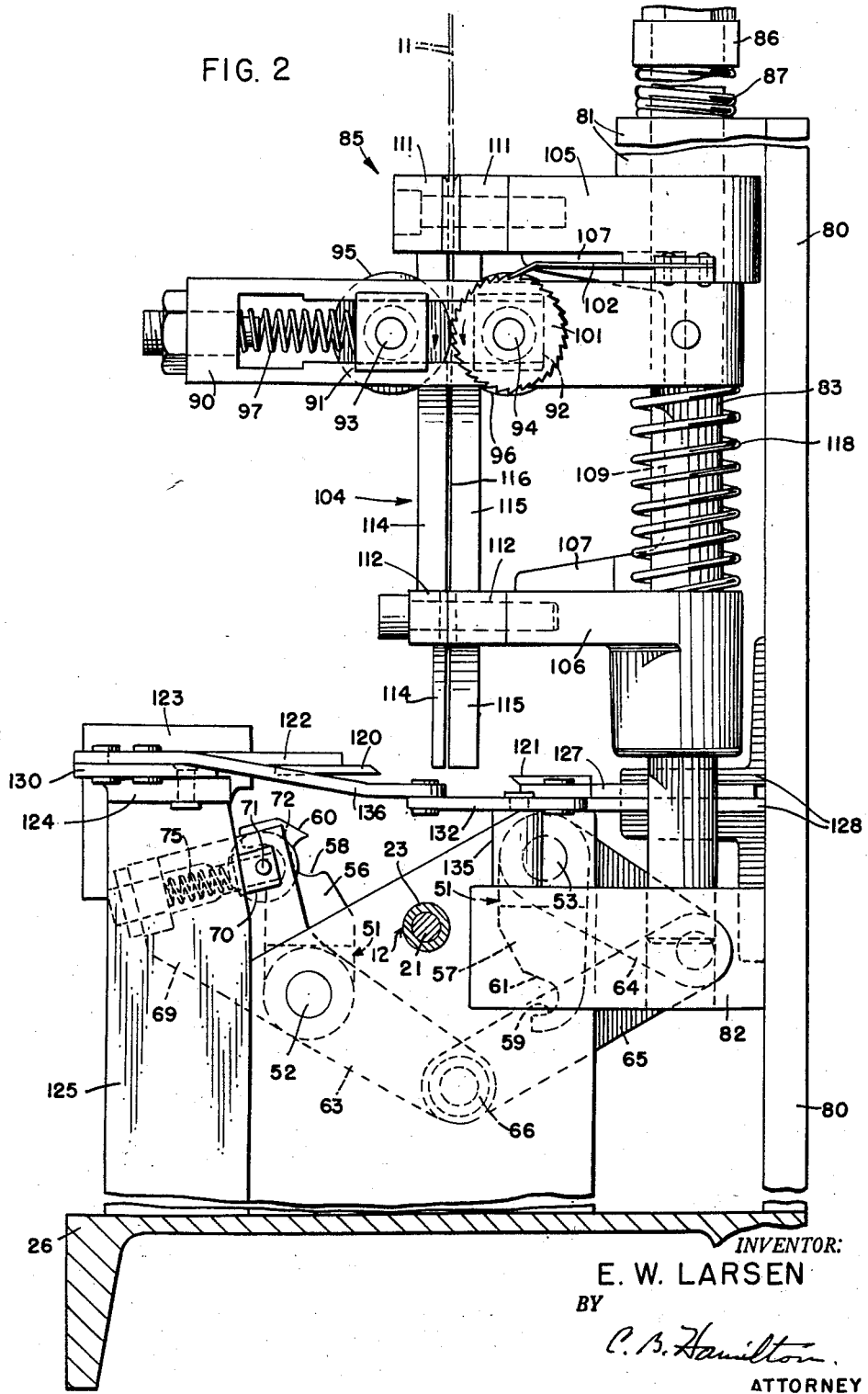

Dec. 8, 1959  E. W. LARSEN  2,916,224
CAPACITOR WINDING MACHINE
Filed Nov. 6, 1953  4 Sheets-Sheet 3
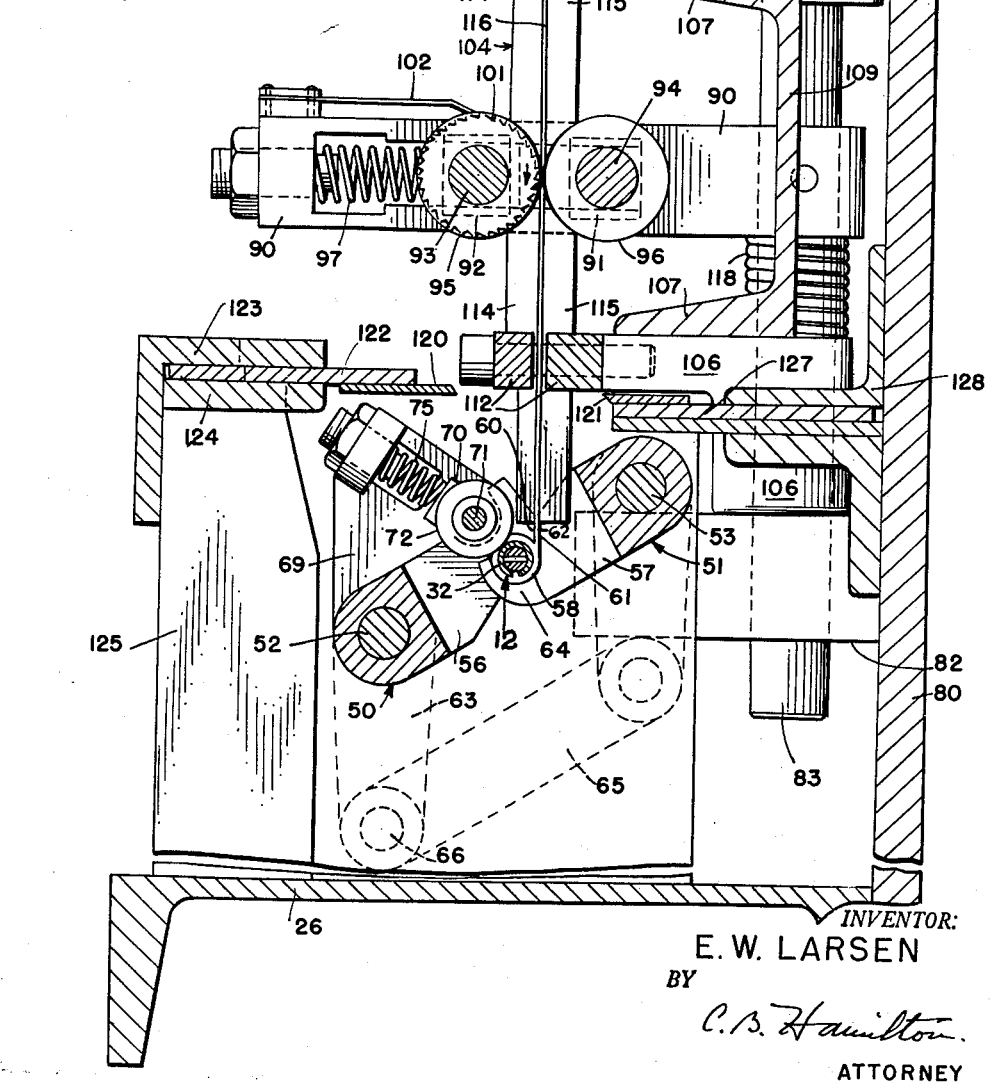
INVENTOR:
E. W. LARSEN
BY
C. B. Hamilton.
ATTORNEY

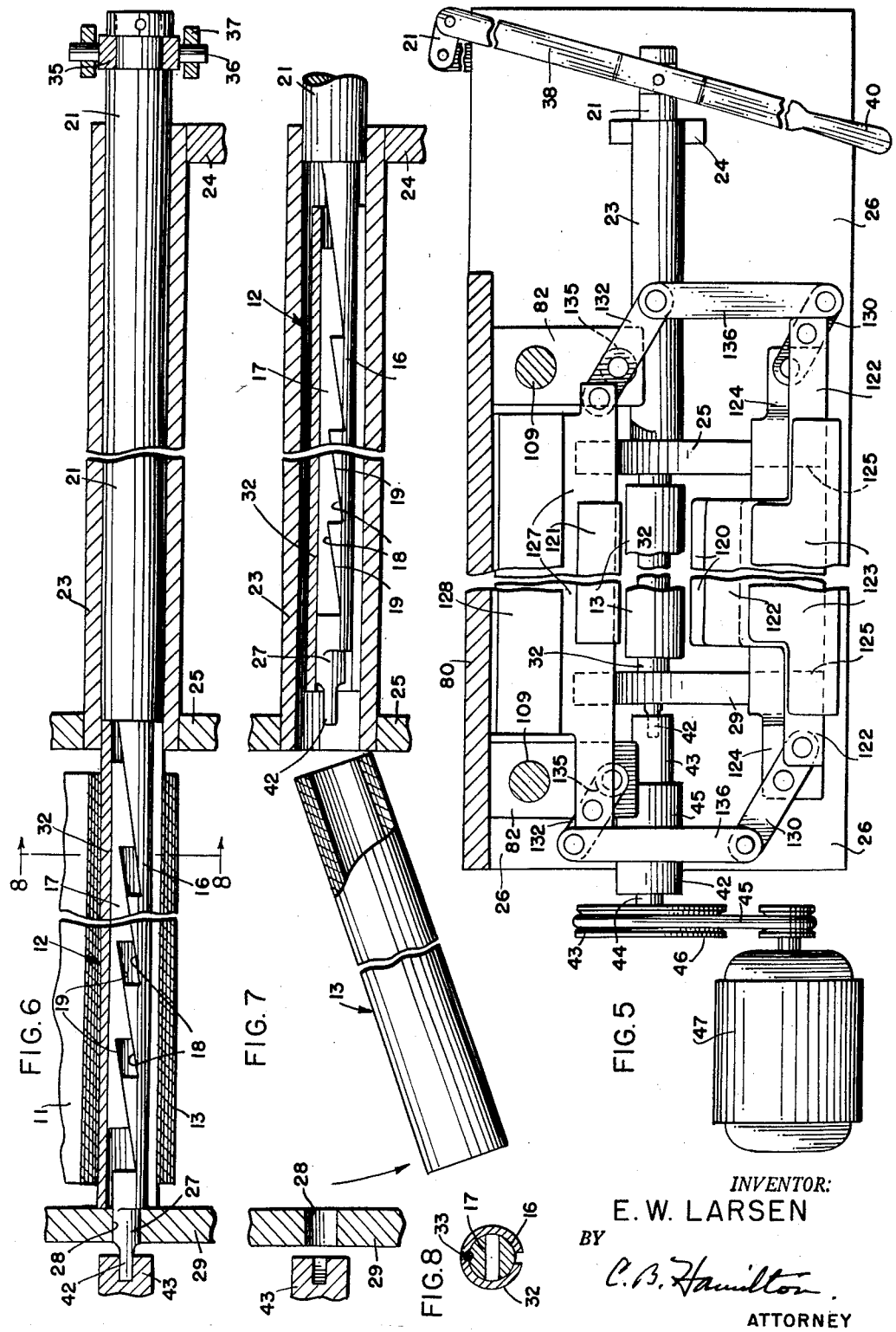

United States Patent Office 2,916,224
Patented Dec. 8, 1959

2,916,224
CAPACITOR WINDING MACHINE

Einer W. Larsen, Elmhurst, Ill., assignor to Western Electric Company, Incorporated, New York, N.Y., a corporation of New York Application November 6, 1953, Serial No. 390,662

10 Claims. (Cl. 242—56.1)

This invention relates to a machine for winding strip material and more particularly to a machine having a collapsible arbor for winding capacitors.

An object of the present invention is to provide a machine for winding strip material and having a simple mechanism for forming the initial convolutions of the strip on the arbor of the machine.

Another object of the invention is the provision of a strip-winding machine having a collapsible arbor to facilitate the removal of the wound material therefrom.

In accordance with one embodiment of the invention as applied to the winding of capacitors there is provided an arbor for winding strips of metallized paper thereon, pairs of diametrically opposed pivoted arms having irregularly shaped ends movable into close proximity to the arbor to form an annular guideway around the arbor and a guide slot tangential to the annular guideway, a carriage mounted for reciprocable movement parallel to the tangential guide slot, a guide member yieldably mounted on said carriage for movement therewith into close proximity to said pivoted guide members and having a guide slot aligned with said tangential guide slot for directing the metallized strip thereinto, gripping elements on said carriage operable to grip said strips therebetween and advance the strips from a supply into the guideway and around said arbor in response to movement of the carriage in one direction to form the initial convolution of the condenser on the arbor. The arbor is collapsible to permit the wound condenser to be readily removed therefrom.

Other objects and advantages of the invention will become apparent by reference to the following detailed description and the accompanying drawings illustrating a preferred embodiment thereof, in which Fig. 1 is a front elevational view of the machine with portions thereof broken away;

Fig. 2 is a vertical sectional view of the machine taken on the line 2—2 of Fig. 1 and showing the parts in one position;

Fig. 3 is a vertical sectional view of the machine taken on the line 3—3 of Fig. 1 showing parts thereof in a different position;

Fig. 4 is a fragmentary view showing the pivotal guide members for guiding the strip material around the arbor;

Fig. 5 is a plan sectional view of a portion of the machine taken on the line 5—5 of Fig. 1;

Fig. 6 is a longitudinal vertical sectional view through the arbor showing the arbor in a forward and expanded position;

Fig. 7 is a view similar to Fig. 6 showing the arbor in a retracted and collapsed position; and Fig. 8 is a detailed cross-sectional view through the arbor taken on line 8—8 of Fig. 6 and showing it in expanded position without the strips wound thereon.

The present machine 10 is adapted to wind a pair of metallized strips 11 of dielectric onto an arbor 12 (Figs. 3, 5, 6, and 7) to form capacitors 13, and to facilitate the winding of the capacitors by guiding and advancing the end portions of the strips 11 around the arbor to form one or more convolutions of the capacitor prior to imparting rotation to the arbor. The arbor 12 is capable of being collapsed and expanded and comprises a pair of parti-cylindrical arbor elements 16 and 17 having cylindrical outer surfaces and a plurality of inner sloping cam surfaces 18 and 19, respectively, engageable with each other for supporting the element 17 for longitudinal movement on the element 16 and for transverse oblique movement relative thereto in response to said longitudinal movement. The arbor element 16 has an enlarged cylindrical shank 21 supported for rotation and axial reciprocation in a sleeve 23 which is secured to brackets 24 and 25 mounted on a base 26. The cylindrical end portion 27 of the element 16 is movable into and rotatably supported in a bearing aperture 28 in a bracket 29 fixed to the base. A split sleeve 32 of spring metal encircles the arbor elements 16 and 17 and is secured to the element 17 as by spot welding 33 (Fig. 8). The sleeve 32 and the element 17 attached thereto cooperate with the element 16 of the arbor to form the collapsible portion of the arbor on which the condenser is to be wound.

The shank portion 21 of the arbor extends beyond the sleeve 23 and has a shifting collar 35 mounted for rotation thereon and against axial movement relative thereto. The collar 35 has a pair of pins 36 which fit into apertures in a yoke portion 37 of a shifting lever 38 which is pivoted at one end and has a handle 40 by means of which the lever may be actuated to reciprocate the arbor to and from a forward or operative position (Fig. 6) and a retracted position (Fig. 7). As the arbor is advanced to its forward position the sleeve 32 engages the bracket 29 and the sleeve 32 and the element 17 are held against axial movement while the element 16 of the arbor 12 continues to advance relative to the element 17 and the sleeve 32 into its forward position shown in Fig. 6 to effect the relative movement of the elements 16 and 17 into the expanded position of the arbor. In its expanded position (Figs. 6 and 8) the cross section of the sleeve 32 is substantially circular.

At the forward end of the arbor 12 the element 16 is provided with a rectangular connector element 42 which is adapted to engage a similarly shaped socket formed in a drive member 43 on one end of a shaft 44 (Fig. 5) which is journalled in a bearing bracket 45 mounted on the base 26. The shaft 44 is connected through a pulley and belt drive connection 46 to a motor 47 for rotating the shaft 44 and the arbor 12. After a capacitor 13 has been wound on the arbor as shown in Fig. 6, the arbor may be moved to the right as viewed in Fig. 6 to withdraw it from the capacitor to eject the capacitor. As the arbor moves to the right the end of the capacitor engages the bearing sleeve 23 and its movement is arrested thereby and the capacitor frictionally gripping the sleeve 32 serves to momentarily arrest the movement of the spring sleeve 32 and the arbor element 17 while the element 16 of the arbor continues its movement relative thereto to effect the collapse of the arbor and permit the withdrawal of the arbor from the capacitor.

Means are provided for forming a guideway adjacent the arbor for guiding the end portion of the strips 11 therearound. A pair of guide members or bars 50 and 51 are mounted parallel to and on opposite sides of the arbor 12 on shafts 52 and 53 which are journalled in the brackets 25 and 29. The guide members 50 and 51 have a plurality of fingers 56 and 57, respectively, formed thereon which have irregular shaped end portions thereon including arcuate recesses 58 and 59 (Fig. 2) and straight portions 60 and 61. The bars 50 and 51 are adapted to be oscillated about the axis of the shafts 52 and 53 shown in Figs. 2 and 3 so that with the fingers 56 and 57 in closed position as shown in Figs. 3 and 4, the arcuate recesses 58 and 59 are disposed in close proximity to the periphery of the arbor 12 and form an annular guideway therearound and the straight surfaces 60 and 61 form a vertical guideway or entrance slot 62 extending tangentially from the annular guideway. Fixed to one end of the shafts 52 and 53 are lever arms 63 and 64 (Figs. 1, 2, and 3) which are connected together by a link 65. A handle 66 is provided on the lever 63 by means of which the guide members 50 and 51 may be moved to and from their open and closed positions. Also fixed to the shaft 52 at each end of the guide member 54 are arms 69 which are slotted to receive bearing blocks 70 for rotatably supporting therein the ends of a shaft 71. Rollers 72 are mounted on the shaft 71 between the arms 56 and the bearing blocks 70 are stressed by springs 75 for movement on the arms 69 in one direction to yieldably press the rollers 72 against the arbor 12 when the guide members 50 and 51 are in closed position (Fig. 4).

Fixed to the base 26 and extending upwardly therefrom at the rear portion thereof is a frame member 80 onto the front side of which are secured pairs of apertured bearing brackets 81—82 for slidably receiving and guiding therein a pair of vertical guide rods 83 forming part of a reciprocable carriage 85. The upper end of the rods 83 are tied together by a cross bar 86 and springs 87 interposed between the bars and bearing blocks 81 serve to stress the rods 83 and the carriage 85 for movement upwardly to its upper position as shown in Fig. 2. A pair of horizontally disposed arms 90 are pinned to the guide rods 83 and each arm has a slot in which is mounted a pair of bearing blocks 91 and 92 in which are rotatably supported the ends of shafts 93 and 94. The shafts 93 and 94 support a plurality of rollers 95 and 96, respectively, in axially spaced relation to one another and the bearing blocks 91 are stressed for movement by springs 97 toward the bearing blocks 92 to urge the rollers 95 toward the rollers 96 to grip the strips 11 therebetween. The strips 11 from suitably supported supply rolls are adapted to be initially advanced by the rolls 95 and 96 into the tangential and annular guideways formed by the guide members 50 and 51. The shafts 93 and 94 are each provided with a ratchet wheel 101 which cooperates with a spring pawl 102 fixed to the arms 90 for holding the shafts and rollers against rotation in one direction while permitting free rotation of the rollers in the opposite direction as indicated by the arrows in Figs. 2 and 3. The two sets of rollers 95 and 96 thus act as gripper members to grip the supply strips 11 of metallized dielectric therebetween and feed the strips downwardly in response to downward movement of the carriage 85 while permitting free downward movement of the strips 11 relative to the rollers 95 and 96.

A strip guide unit or mechanism 104 is mounted on the carriage 85 for guiding the ends of the strips 11 from the gripper rolls 95 and 96 into the tangential guideway 62 and the annular guideway around the arbor 12. A pair of arms 105—106 apertured to receive the guide rods 83 for sliding movement thereon are secured to portions of the flanges 107 of a channel member 109. The channel member 109 supports the bars 105 and 106 in fixed spaced relation to each other and portions of the member 109 are cut away to provide clearance for the guide rods 83. A pair of cross bars 111 and 112 are fixed to and extend across from the pairs of arms 105 and 106, respectively, in spaced relation to each other and have pairs of vertical guide strips 114 and 115 secured thereto in spaced relation to each other to provide a vertically extending guideway 116 between the strips 114 and 115 and between the bars 111 and 112. Thus, the channel member 109, the arms 105, 106, and the guide strips 114 and 115 form the guide unit 104 which is slidably mounted on the rods 83 for vertical movement with and relative to the carriage 85. The guide strips 114, 115 are staggered relative to the fingers 56, 57 on the guide members 50, 51 to permit movement of the strips 114, 115 to a level as shown in Fig. 2 whereby the guideway 116 of the guide unit 104 is aligned with and forms a continuation of the tangential guideway 62 of the guide members 50, 51. Springs 118 interposed between the gripper supporting arm 90 and the arm 106 of the guide unit 104 serve to urge the guide unit 104 downwardly relative to the gripper rollers 93 and 94 to the position shown in Fig. 2 in which position a portion of the arm 105 engages the arm 90 to support the guide unit 104 in its normal position on the carriage 85. The upward movement of the carriage 85 and the rods 83 is arrested by the engagement of the arms 105 with the upper bearing blocks 81 to position the carriage 85 in its normal upper position (Fig. 2).

Cutting means are provided for severing the strips 11 after a capacitor has been wound on the arbor which means includes a pair of cooperating cutting blades 120, 121. The blade 120 is secured to a plate 122 which is mounted for horizontal sliding movement in a guideway formed between an L-shaped member 123 and a member 124 supported on the upper ends of a pair of brackets 125 mounted on the base 26. The blade 121 is secured to a plate 127 slidably supported for horizontal movement in guide members 128 fixed to the vertical frame member 80. The ends of the plate 122 are pivotally connected to a pair of lever arms 130 (Fig. 5) which are pivotally supported for oscillatable movement on the ends of the member 124, and the ends of the plate 127 are pivotally connected onto a pair of levers 132 which are pivotally supported on posts 135 mounted on the bearing brackets 82. The ends of the lever arms 130 and 132 are pivotally connected to opposite ends of links 136. The arrangement of links and levers is such that in response to actuation of the plate 122 simultaneous movement in opposite directions is imparted to the cut-off blades 120 and 121. Thus, when the carriage 85 is in its upper position and it is desired to sever the strips 100, the operator engages the ends of the plate 122 and moves them forwardly, causing the horizontal movement of the blades 120 and 121 towards each other on opposite sides of the strips 11 into engagement with each other to sever the strips at a level slightly below the lower ends of the guide strips 114, 115 (Fig. 2).

In the operation of the device the ends of the strips 11 of metallized dielectric from the supply rolls are positioned in the guideway 116 and between the gripper rollers 95 and 96 of the carriage 85 with the ends of the strips 11 extending slightly below the lower end of the guide members 114 and 115, and the pivoted guide members 50 and 51 are moved to their closed position (Figs. 3 and 4). The operator may then engage portions of the carriage 85 such as the arms 90 or the cross bar 86 and move the carriage downwardly to its lower position as shown in Fig. 3. During the downward travel of the carriage 85, the gripper rollers 95 and 96 and the reciprocable guide unit 104 move in unison therewith until movement of the guide unit 104 is arrested intermediate the ends of the stroke of the carriage by the engagement of the downwardly directed boss on the arm 106 with the bearing block 82 (Fig. 3) in which position the lower ends of the strips 11 are disposed in the tangential guideway 62. The downward movement of the gripper rollers 95 and 96 continues a predetermined distance as the springs 118 are compressed to cause the ends of the strips 11 to be guided around the arbor 12 to form one or more convolutions of the capacitor thereon. With the ends of the strips 11 wrapped around the arbor and pressed thereagainst by the pressure rollers 72, the motor 44 may be started to rotate the arbor 12 and wind the strips 11 thereon to form a capacitor. After a half dozen or so convolutions of the strips have been wound on the arbor and are tightly gripped thereon the guide members 50 and 51 are moved to their open position (Fig. 1) and the carriage 85 is raised to its upper position. After a predetermined length of the strips 11 have been wound on the arbor to form the capacitor, the motor and the arbor 12 are stopped and the cutters 120 and 121 are actuated to sever the strips 11. The loose end of the strips 11 on the capacitor may be adhered to the capacitor as by gluing after which the arbor 15 is axially withdrawn from the capacitor to cause the ejection thereof from the machine.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A machine for winding a strip of material comprising a rotatable arbor, a plurality of guide members movable to and from an operative position in close proximity to said arbor to form an annular guideway around said arbor and an entrance slot into said annular guideway, said guide members having cooperable cylindrical surfaces extending from the entrance slot continuously around the arbor in concentric relation to the axis thereof for guiding the end of said strip around said arbor and into engagement therewith, a guide element mounted for movement toward said guide members to a predetermined position and having a guideway therein for directing said strip into the entrance slot in said annular guideway, gripping means mounted for movement with said guide element to said predetermined position and for limited movement relative to said guide element for gripping and advancing said strip in said guide element through a predetermined distance to feed the end of said strip into said annular passageway and around and into engagement with said arbor, and means for rotating said arbor.

2. A machine for winding strips of material comprising a rotatable arbor, a plurality of guide members movable to and from an operative position in close proximity to said arbor to form an annular guideway around said arbor and an entrance into said annular guideway, said guide members having cooperable cylindrical surfaces extending from the entrance continuously around the arbor in concentric relation to the axis thereof for guiding the ends of said strips around said arbor and into engagement therewith, a guide element mounted for movement to and from a retracted position in spaced relation to said guide members and an advanced position in close proximity to said guide members and having a guideway therein for directing said strips into the entrance of said annular guideway, gripping means mounted for movement with said guide element to said advanced position and for limited movement relative to said guide element for gripping and advancing said strips in said guide element through a predetermined distance when said guide element is in said advanced position to feed the ends of said strips into said annular passageway and around and into engagement with said arbor, means for severing said strips adjacent the guide element when said guide element is in its retracted position, means for rotating said arbor, and means on one of the guide members for yieldably pressing said strips against said arbor.

3. A machine for winding a strip of material comprising a rotatable arbor, a plurality of guide members movable to and from an operative position in close proximity to said arbor to form an annular guideway around said arbor and an entrance slot into said annular guideway for guiding the ends of said strip around and into engagement with said arbor, means for rotating said arbor, a carriage, a guide element supported on said carriage for movement therewith and relative thereto and having a guideway aligned with the entrance slot in said guide members for guiding said strip from a supply into said entrance slot, means mounting said carriage for reciprocable movement to and from a normal retracted position and an advanced position for guiding said guide element toward and away from the arbor and said guide members, means for stopping said guide element in a position in close proximity to said guide members and at a point intermediate the ends of the stroke of said carriage, gripping means on said carriage engageable with said strip in said guide element and operable to grip the strip in said guide element and advance it with said guide element during the first portion of the stroke of the carriage and advance said strip relative to said guide element into said annular guideway during the latter part of the stroke of said carriage, means for moving said carriage to and from said retracted and said advanced positions, and cutter means for severing the strip adjacent said guide element when the guide element is in its retracted position.

4. In a machine for winding a strip of material, a rotatable arbor, a pair of guide members having longitudinally spaced interfitting portions, mounting means for supporting the arbor for rotation and the guide members for movement to an operative position in close proximity to the arbor and with said portions in interfitting relation to one another, said guide members having cooperable cylindrical strip engaging surfaces spaced from the arbor when in operative position to form an annular guideway around the arbor and a guide slot extending tangentially therefrom for guiding the end of the strip around the arbor and into engagement therewith, said cooperable cylindrical surfaces being disposed in concentric relation to the arbor and extending continuously from said guide slot, and means for rotating the arbor.

5. In a machine for winding a strip of material, a frame, a collapsible arbor mounted on the frame for rotary and axial movements, means for moving the collapsible arbor axially to and from a winding position, means on the frame engageable with the collapsible arbor for effecting the actuation thereof into expanded position in response to movement of the arbor to its winding position, a plurality of guide members mounted on the frame for movement into close proximity to the arbor to form an annular guideway around the arbor and an opening thereinto for guiding the end portions of the strip around the arbor, means for guiding the strip into the annular guideway, means for moving the strip a predetermined distance to advance the end thereof along the annular guideway and around the arbor, means for rotating the arbor to wind the strip thereon, and stop means on the frame engageable with the strip wound on the arbor for stripping it from the arbor and effecting the collapse of the arbor in response to axial movement thereof from its winding position.

6. A machine for winding a strip of material which comprises a frame, a collapsible arbor mounted on the frame for rotary and axial movements, means for moving the collapsible arbor axially to and from a winding position, means on the frame engageable with the collapsible arbor for effecting the actuation thereof into expanded position in response to movement of the arbor to its winding position, a pair of guide members mounted on the frame for movement into close proximity to the arbor to form an annular guideway around the arbor and a guide slot extending tangentially therefrom for guiding the end portions of the strip around the arbor, roller means yieldably mounted on one of the guide members for pressing the strips against the arbor, a guide element mounted on the frame for limited movement toward and away from the arbor and forming a guideway therein aligned with the tangential guide slot for guiding the strip thereinto, means for moving the strip through a predetermined distance to advance the end portion thereof into the annular guideway and around the arbor, means for rotating the arbor to wind the strip thereon, stop means on the frame engageable with the strip wound on the arbor for stripping it from the arbor and effecting the collapse of the arbor in response to axial movement thereof from its winding position, and a cutting means for shearing the strip adjacent the guide element when it has been moved from the arbor.

7. A machine for winding a strip of material comprising a rotatable arbor, a plurality of guide members mounted for movement to an operative position in close proximity to said arbor to form an annular guideway around the arbor and a tangential entrance slot into the guideway for guiding the end of said strip around the arbor, guide means forming a guideway aligned with the entrance slot for guiding said strips thereinto, means for mounting the guide means for movement toward the arbor from a normal retracted position to an advanced position in close proximity to the arbor and the guide members, resilient means for moving the guide means to its retracted position, gripping means mounted on the guide means for movement therewith toward the arbor from the retracted position to the advanced position and for movement relative thereto in the same direction from a first position to a second position, said gripping means being operable in response to movement thereof in the said direction to grip the strip and advance it, and resilient means for moving the gripping means from the second to the first position, said gripping means being manually movable toward the arbor to sequentially move the guide means to advanced position and the gripping means to its second position to effect the movement of the strip into the annular guideway and around the arbor.

8. In a machine for winding strips of material, a frame, an arbor rotatably supported on the frame, a plurality of guide members mounted on the frame for movement to an operative position to form an annular guideway around the arbor and a tangential entrance slot into the annular guideway, guide means mounted on the frame for movement toward the arbor from a normal retracted position to an advanced position adjacent the arbor and forming a guideway aligned with the entrance slot for guiding the strips thereinto, resilient means for moving the guide means to the retracted position, a carrier mounted on the frame for movement with the guide means toward the arbor from the retracted position to the advanced position and for continued movement in the same direction relative to the guide means from a normal first position thereon to a second position, resilient means for moving the carrier to its first position, and gripping means mounted on the carrier to grip the strips and advance them in response to movement of the carrier toward the arbor, the arrangement of the parts being such that in response to actuation of the carrier toward the arbor the gripping means and the guide means are moved together from the retracted position to the advanced position of the guide means and the gripping means is then moved from its first position to its second position relative to the guide means to feed the ends of the strips into the annular guideway and around the arbor, and cutting means for severing the strips adjacent the guide means when the guide means is in its retracted position.

9. In a machine for winding strips of material, a frame, an arbor rotatably supported on the frame, a plurality of guide members mounted on the frame for movement to an operative position to form an annular guideway around the arbor and a tangential entrance slot thereinto, guide means mounted on the frame for movement toward the arbor from a normal retracted position to an advanced position adjacent the arbor and forming a guideway aligned with the entrance slot for guiding the strips thereinto, resilient means for moving the guide means to the retracted position, a carrier mounted on the frame for movement with the guide means toward the arbor from the retracted position to the advanced position and for continued movement in the same direction relative to the guide means from a normal first position thereon to a second position, resilient means for moving the carrier to its first position relative to the guide means, a pair of rollers rotatably mounted on the carrier for engaging the strips therebetween, means for preventing rotation of the rollers in one direction to cause the rollers to grip the strips and advance them in response to movement of the carrier toward the arbor, the arrangement of the parts being such that in response to actuation of the carrier toward the arbor the gripping rolls and the guide means are moved together from the retracted position to the advanced position of the guide means and the gripping rolls are then moved from its first position to its second position relative to the guide means to feed the ends of the strips into the annular guideway and around the arbor, and cutting means for severing the strips adjacent the guide means when the guide means is in its retracted position.

10. In a strip-winding machine, a frame, a collapsible arbor mounted on the frame for rotary and axial movements, means for moving the collapsible arbor axially to and from a winding position, means on the frame engageable with the collapsible arbor for effecting the actuation thereof into expanded position in response to movement of the arbor to said winding position, means for rotating the arbor to wind a strip thereon, and means on the frame engageable with the strip wound on the arbor for stripping it from the arbor and effecting the collapse of the arbor in response to axial movement of the arbor from said winding position.

References Cited in the file of this patent

UNITED STATES PATENTS

| | | |
|---|---|---|
| 1,966,525 | Schultz et al. | July 17, 1934 |
| 2,040,323 | McCain | May 12, 1936 |
| 2,082,031 | Schultz et al. | June 1, 1937 |
| 2,119,445 | Scott | May 31, 1938 |
| 2,271,139 | Holdgate et al. | Jan. 27, 1942 |
| 2,675,188 | Larsen | Apr. 13, 1954 |
| 2,797,879 | Marcus | July 2, 1957 |